Sept. 30, 1969  W. J. S. JOHNSON ET AL  3,469,343
SUPPORTING DEVICE
Filed Nov. 22, 1967  4 Sheets-Sheet 1
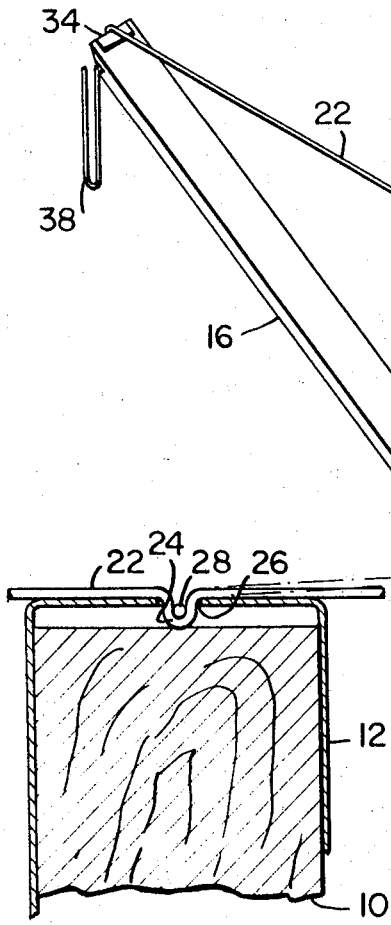
FIG_1
FIG_2
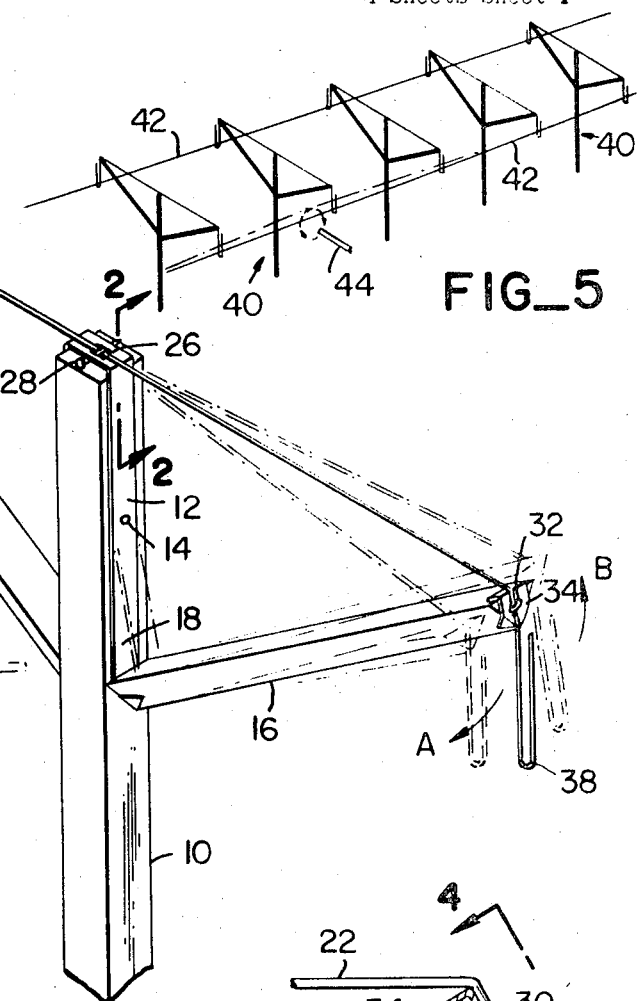
FIG_5
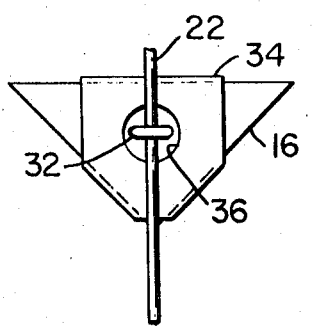
FIG_4
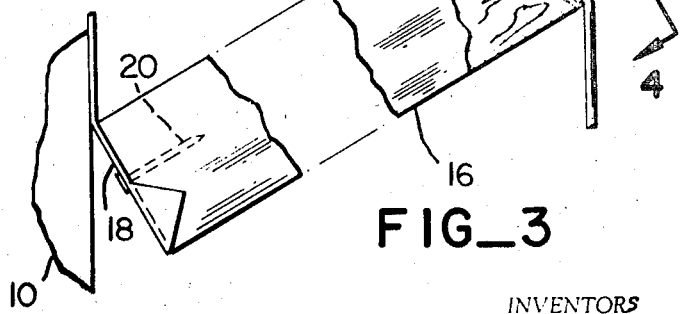
FIG_3
INVENTORS
WALLACE J. S. JOHNSON
BY ROBERT E. FISHER
*Mellin, Moore & Weissenberger*
ATTORNEYS

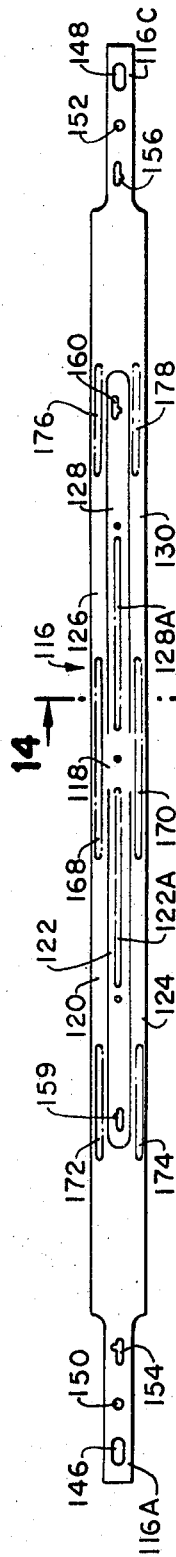
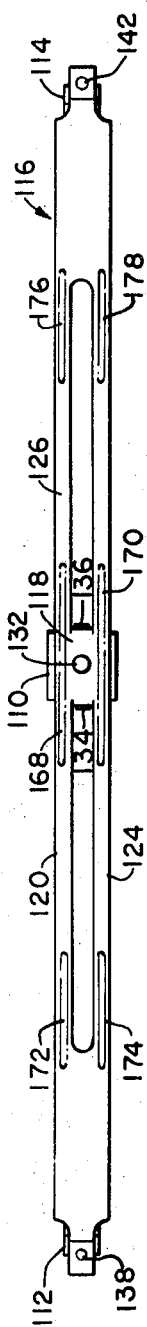
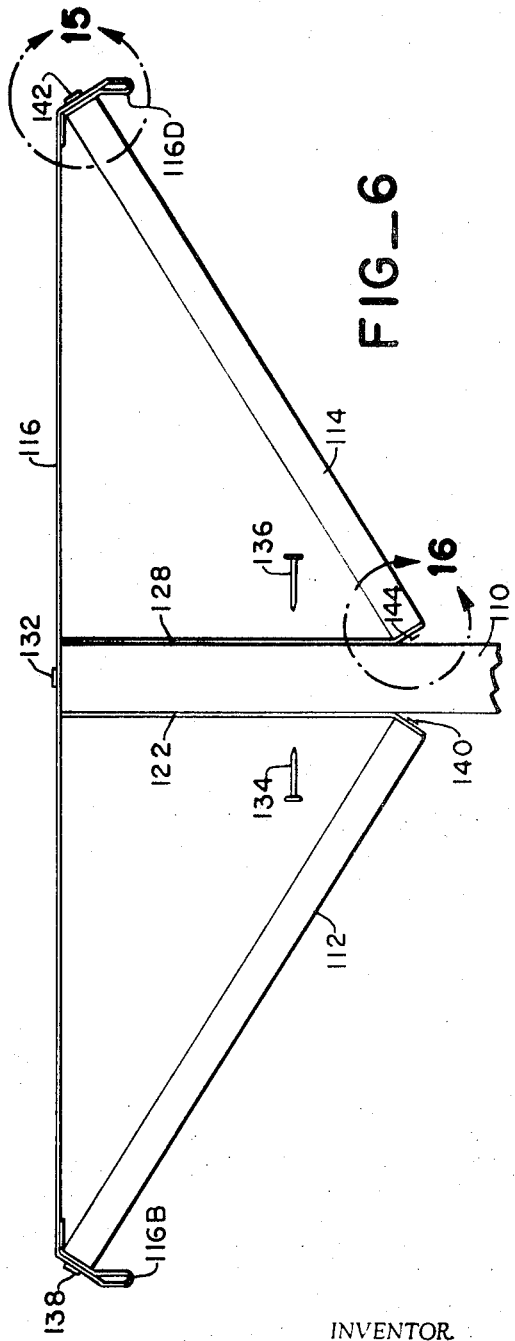

Sept. 30, 1969    W. J. S. JOHNSON ET AL    3,469,343
SUPPORTING DEVICE
Filed Nov. 22, 1967    4 Sheets-Sheet 3
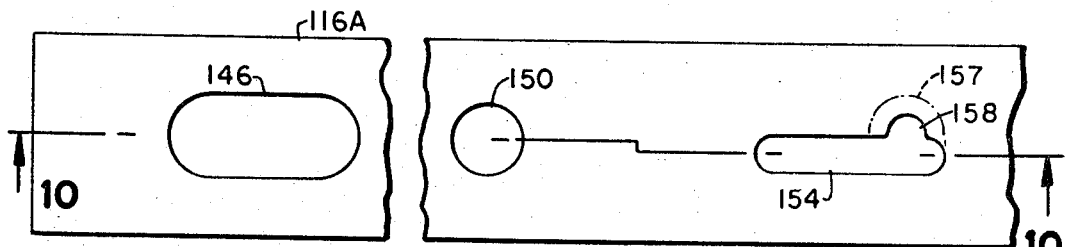
FIG_9
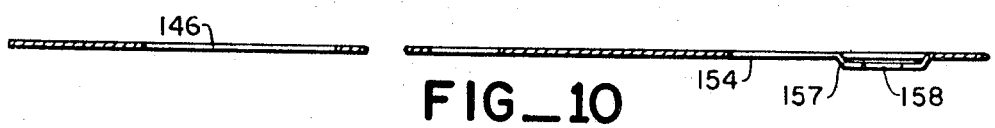
FIG_10
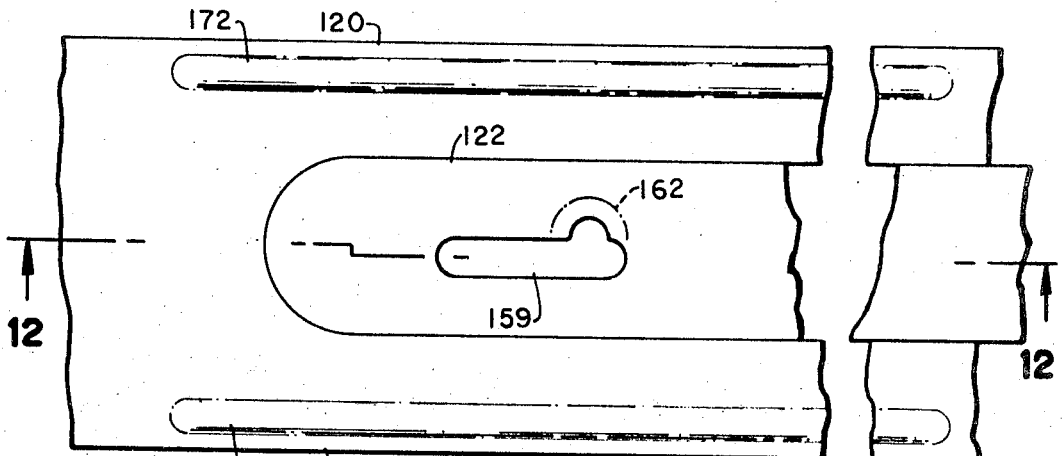
FIG_11
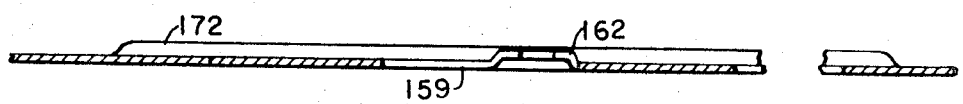
FIG_12
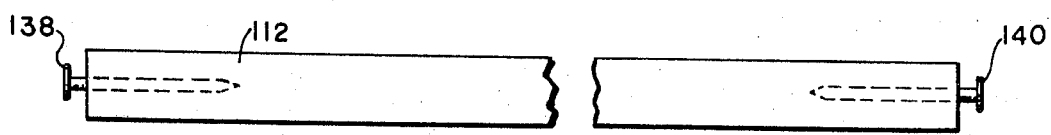
FIG_13
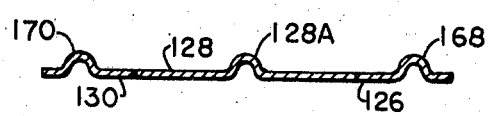
FIG_14
INVENTOR.
WALLACE J. S. JOHNSON
ROBERT E. FISHER
BY
Mellin, Moore & Weissenberger
ATTORNEYS Sept. 30, 1969 W. J. S. JOHNSON ET AL 3,469,343
SUPPORTING DEVICE
Filed Nov. 22, 1967 4 Sheets-Sheet 4
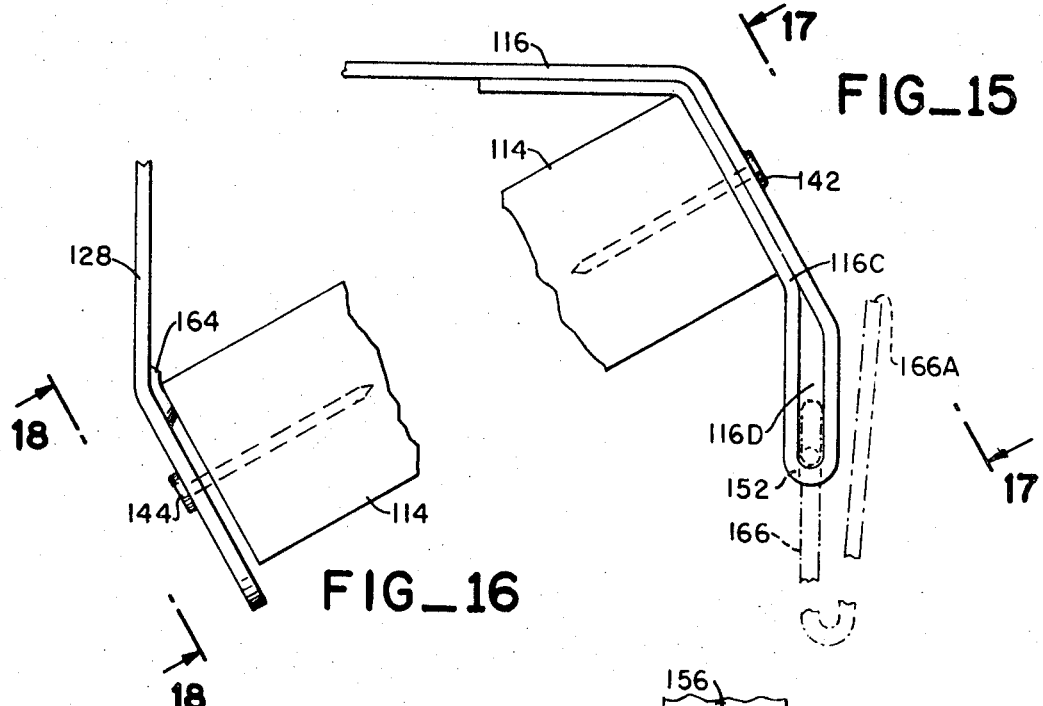
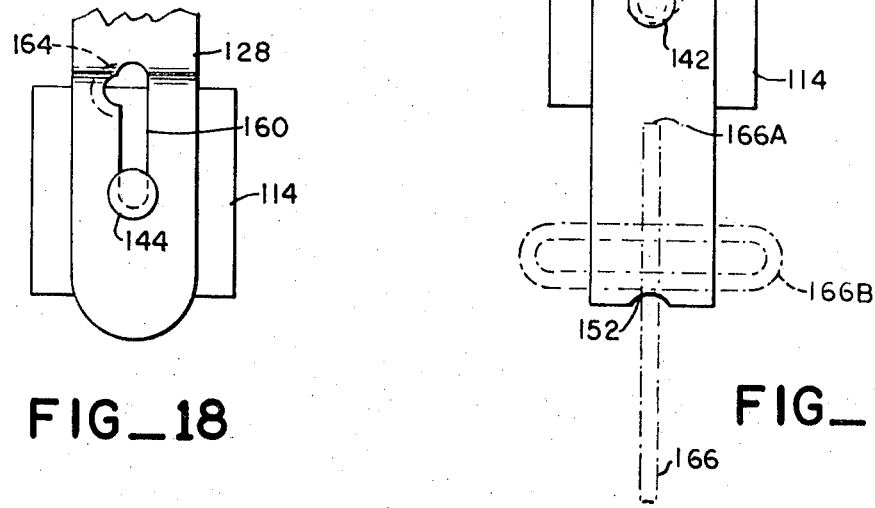
INVENTOR.
WALLACE J. S. JOHNSON
ROBERT E. FISHER
BY
ATTORNEYS

United States Patent Office 3,469,343
Patented Sept. 30, 1969

3,469,343
SUPPORTING DEVICE
Wallace J. S. Johnson and Robert E. Fisher, Berkeley, Calif., assignors to Up-Right, Inc., Berkeley, Calif., a corporation of California
Continuation-in-part of application Ser. No. 612,959, Jan. 31, 1967. This application Nov. 22, 1967, Ser. No. 689,232
Int. Cl. A01g *17/06;* G09f *17/00;* F16m *13/02*
U.S. Cl. 47—46                                   9 Claims

ABSTRACT OF THE DISCLOSURE

A supporting device which includes a standard, arms pivotally connected to the standard, and a flexible, non-extensible member fixed to the arms and to the standard, whereby the member limits the downward movement of the arms under weight applied thereto while allowing their movement in directions other than downward.

Cross references to related applications

This invention is a continuation-in-part of our co-pending application entitled Supporting Device, Ser. No. 612,959, filed Jan. 31, 1967, now abandoned.

Background of the invention

This invention relates to line supporting devices, and, more particularly, to a support device having arms which are held from moving under weight applied thereto to support that weight while being capable of moving in other directions.

Supporting devices having a standard and arms extending therefrom obviously have many uses, of which one is a grape trellis for supporting rows of wire on which grapes are grown for producing wine. In that application, the grape vines are generally grown up the standard, along the arms and then along the wires.

The usual grape trellis is constructed by simply nailing a wooden cross-piece to a wooden standard which is fixed in the earth. This device, however, is not capable of supporting a particularly great load on its arms, and since the standard and crosspiece are held together by nails, there is a tendency for the wood of either piece to split along its grain where a nail is placed if the load on one arm is greater than the load on the other. This is, of course, aggravated with the aging and weathering of the wood.

Even more important, the usual type of grape trellis is not well adapted for use in conjunction with the conventional mechanized apparatus now employed for picking grapes and which inclueds a knocker rod which is translated in a circular path. The apparatus is designed to travel adjacent a wire on which the grapes are grown, the wire being suported at intervals by the cross-piece of the trellises. As the apparatus travels along the wire, the knocker rod, traveling in the manner described above, moves upward under the wire, contacts the wire and carries it and the grapes thereon upward, and then moves up and out from under the wire. The released wire, with the weight of the grapes carried thereon, drops until the wire grows taut and suddenly stops its travel. This sudden stop results in the grapes coming from the vines and falling into a hopper which is carried under the wire along with the picking apparatus. The usual type of support is clearly not well adapted for use with this picking apparatus, since, as the apparatus travels down the wires, the knocker rod is very likely to strike a rigid cross-piece of the support apparatus and thereby cause injury to either the support device or the picking arm.

It is an object of this invention to overcome the above disadvantages by providing a support device having arms which are capable of supporting a relatively great amount of weight and which are capable of being moved upwardly or laterally while supporting that weight.

It is a further object of the invention to provide a support device which fulfills the above objects while being of simple construction and adaptable to a variety of uses.

Summary of the invention

Broadly stated, the device for supporting weight comprises a standard and at least one arm pivotally connected to the standard and adapted to receive the weight. Means are included for limiting the travel of the arm under the weight while allowing the arm to travel in at least one other direction, the arm thereby bearing the weight.

Brief description of the drawings

These and other objects of the invention will become apparent from a perusal of the following specification taken in conncetion with the accompanying drawings, in which:

FIG. 1 is a perspective view of one embodiment of the inventive device;

FIG. 2 is a section taken along the line 2—2 of FIG. 1;

FIG. 3 is a detailed partial elevation, partially broken away, of an arm of the invention;

FIG. 4 is a view taken along the line 4—4 of FIG. 3;

FIG. 5 is a perspective view of a series of the first embodiment of the inventive devices in use;

FIG. 6 is a side elevation of a second embodiment of the device;

FIG. 7 is a plan view of the device of FIG. 6;

FIG. 8 is a plan view of the elongate member used in the device of FIG. 6;

FIG. 9 is a plan view of a portion of the elongate member;

FIG. 10 is a sectional view taken along the line 10—10 of FIG. 9;

FIG. 11 is a plan view of another portion of the elongate member;

FIG. 12 is a sectional view taken along the line 12—12 of FIG. 11;

FIG. 13 is a side elevation of an arm of the second embodiment of the device;

FIG. 14 is a sectional view taken along the line 14—14 of FIG. 8;

FIG. 15 is an enlarged fragmentary view taken from area 15 of FIG. 6;

FIG. 16 is an enlarged fragmentary view taken from area 16 of FIG. 6;

FIG. 17 is a view taken along the line 17—17 of FIG. 15;

FIG. 18 is a view taken along the line 18—18 of FIG. 16.

Description of the preferred embodiments

In FIG. 1, a standard 10, which may with advantage be of wood, is shown. The standard 10 is of substantially square cross sections and may be adapted at its lower end to be driven into the ground (not shown). A flexible metal strap 12 is run along one side of the standard 10, across the top, and down an opposite side as shown in FIGS. 1 and 2. Those portions of the strap 12 running along the sides of the standard 10 are fastened thereto by nails 14. A wooden arm 16 is fitted against each strap end 18, the end of each arm 16 abutting the lowermost outward surface portion of the strap 10. Each arm 16 is triangular in cross section (FIG. 4) with a point of the triangle facing downward, and sufficient metal is left at the ends 18 of the strap 12 to fold around the edges of the arm 16. Each strap end 18 is fixed to its related arm 16 by a nail 20, the folded portion of the strap end 18 serving to keep each arm 16 from rotating relative to the strap 12.

Thus the arms 16 are pivotally connected to the standard 10, the flexing of the metal strap 12 allowing the pivoting. It is to be noted that there is sufficient strap length betwen the point where an arm 16 is fixed to the strap 12 by nail 20 and the point where the strap 12 is fixed to the standard 10 by the nail 14 to ensure that substantial pivoting of arm 16 relative to the standard 10 is allowed without pulling nails 14 or 20 out.

A single flexible non-extensible elongate metal rod member 22 having a bent portion 24 at its center is disposed across the top portion of the standard 10 on top of the strap 12 with the bent portion 24 fitting into an aperture 26 in the strap 12. Sufficient space is left between the top of the standard 10 and the strap 12 to allow the bend 24 to fully fit into the aperture 26 to an extent sufficient to allow a nail 28 to be slid through the bent portion 24 between the strap 12 and the end of the standard 10. This serves to hold the rod 20 relative to the standard 10.

The rod 22 has bent portions 30 formed thereon, each bent portion 30 being adapted to be fixed to the end of an arm opposite its pivoted end by means of a staple 32. This is facilitated by providing a metal cap 34 adapted to fit over an arm end, each cap 34 hving an aperture 36 therein to allow seating of the bent portion 30 therein and to enable a staple 32 to be driven therethrough. The rod 22 is thus fixed to an end of each arm 16, and is fixed so that those ends of the arms 16 are held at substantially the same height as the standard 10.

Each end portion 38 of the rod 20 is bent into a hooked form adjacent the rod portion fixed to an arm 16.

In the use of this embodiment of the invention, a row of inventive support devices 40 are shown supporting paralel wire lines 42 (FIG. 5). These lines 42 are of the type used to support grape vines as described above, but, for clarity, the vines are not shown. The lines 42 are carried by the hooked end portion 38 of the rod 20, and thus each hooked portion 38 is adapted to receive part of the weight of the line 42 and also part of the weight of the vines and grapes hanging on the line 42. This weight is applied to the arms 16 which are positioned to take the load in compression. The rod 20 limits the downward movement of the arms 16 under the load, the rod 20 being under tension in so doing, but since the arms 16 are pivotally connected to the standard 10 and the rod 20 is flexible, the arms 16 and rod 20 are capable of moving laterally, as shown in FIG. 1. Thus, when using a conventional grape-picking apparatus as described above, if the knocked rod 44 (FIG. 5) comes up under and strikes an arm 16, the arm 16 and rod 22 move to the side (A of FIG. 1), continuing support of the weight thereon, the triangular cross section of the arm 16 helping to induce the movement. At worst, the arm 16 moves upward (B of FIG. 1) under the force of the knocker rod 44. In either case, no damage results to either the picking arm 14 or the support device 40, and the arm 16 will return to its original position.

It is to be noted that the compressive force on the arm 16 results in each side portion of the strap 12 being in tension, and since the strap 12 passes over the end of the standard 10, a compressive force on the standard results. As pointed out above, the metal rod 20 is also in tension, and thus the wood parts bearing force are in compression and the metal parts bearing force are in tension. As it is well known that wood is strongest in compression and metal is strongest in tension, the materials in the device are used in a most efficient manner.

Furthermore, it should be noted that the arms 16, strap 12, and rod 22 may be pre-assembled and fitted to a standard 10 already placed in the ground and nailed thereto by nails 14. Thus, when it is desired to fix the device in the ground, the standard 10 may itself be driven into the ground, with the preassembled portion fitted as described above. This is clearly more convenient than driving a complete supporting device, with arms extending therefrom, into the ground. Where it may be found desirable to remove the pre-assembled portion (for replacement thereof or otherwise), only nails 14 need be removed, and the preassembled portion may then be lifted from the standard 10. The standard 10 need not be pulled out of the ground.

A second embodiment of the invention is shown in FIGS. 6–18. This embodiment includes a wooden standard 110 and arms 112 and 114 as in the previous embodiment. However, an elongate member 116, which is different from the means of the first embodiment, is used. The elongate member 116 is of substantially flat metal, and includes a central plate 118. Two elongated U-shaped cuts are made on either side of the plate 118, as shown in FIG. 8. These cuts form extensions 120, 122, 124, 126, 128 and 130, which extend from the plate 118.

The plate 118 is fitted to an end of the standard 110 by means of a nail 132, and extensions 122, 128 are folded down against either side of the standard 110 and nailed thereto by nails 134, 136. Ribs 122A, 128A, formed on extensions 122, 128 respectively, stiffen those extensions as they are bent down, and insure that they fold in the proper places. Arm 112 has nails 138, 140 in either end thereof, and arm 114 has nails 142, 144 in either end thereof. Each of these nails is driven into an end to a point where its head is approximately 3/16 of an inch from the end itself. Preferably these nails are driven into the ends of arms 112 and 114 before they are taken to the point of use in the vineyard.

Member 116 has a pair of slots 146, 148 cut therein adjacent either end thereof. Inward of these slots are a pair of apertures 150, 152 and inward of these apertures are a pair of slots 154, 156, one (154) of which is shown more clearly in FIGS. 9 and 10. Slot 154 is approximately 2½ times as long as the diameter of a nail head, and is of a width sufficient to pass the body of the nail 138 therethrough, but not the head. Formed on the inner end of slot 154 is a semi-circular downward depression 157 which is offset and which is approximately the diameter of the head of the nail 138. A central portion 158 of the depression 157 is removed. Arm 112, having nail 138 therein, may be fixed to the member 116 as follows: The head of the nail 138 is slid into the depression 157 on the lower side of member 116. The depression 157 is of configuration to allow the head to move into itself, and the removed central portion 158 allows such movement. The depression 157 and removed central portion 158 allow sufficient movement of the nail 138 so that the trailing edge of the head thereof clears the adjacent edge of the slot 154. The head may then be pushed through the slot 154 and to the end thereof remote from the depression 157, where it will be held by the slot 154. Hence the arm 112 may be held to the member 116. In this embodiment, the end 116A of the member 116 is folded back on itself so that slot 146 is in registry with slot 154 before the arm 112 is attached. Slot 146 is wide enough to allow the head of nail 138 therethrough. The head is placed therethrough and then disposed in and held by the slot 154 as described above. The folding back of the end 116A provides a loop 116B in the member 116, the utility of which will be described later.

As has already been mentioned, slot 148, aperture 152, and slot 156 are formed on the opposite end of member 116. These are similar in configuration to slot 146, aperture 150, and slot 154, and after end 116C is folded back on itself to form loop 116D, an end of arm 114, having nail 142 therein, is fitted to the member 116 by these means.

At the ends of the extensions 122, 128 are slots 159, 160, which are similar in configuration to slots 154, 156. However, the depressions 162, 164 extend in a direction opposite the depression 157. It will be seen that these slots 159, 160 act in the same manner as slots 154, 156 to hold the ends of arms 112, 114 respectively by means of nails 140, 144. As seen in FIG. 16, the end of arm 114 is adapted to urge on extension 122 to close the depression 164, which acts to hold the lower end of arm 114 in place. Slot 162 and arm 112 work in a similar manner.

The loops 116B, 116D may carry wire therethrough or may have fitted thereto wire hangers, one of which (166) is shown in FIGS. 15 and 17. To install the hanger 166, the end 166A thereof is put through aperture 152, and the body thereof is moved therethrough. The bent end 166B of the hanger 166 is then forced into the loop 116D and is held in place within the loop 116D. The hanger 166 may easily be removed by forcing the bent end 116B out from within the loop 116D and removing the body thereof through aperture 152.

It will be noted that ribs 168, 170 are formed on the plate 118 and extend onto extensions 120, 124, 126, 130. These ribs strengthen the extensions at their stress concentration points, as do ribs 172, 174, 176, 178.

This embodiment of the invention is used in the same manner as the previous embodiment. It will be seen, however, that the one-piece elongate member 116 replaces the rod 22 and strap 12 of the previously described embodiment. It will be seen that elongate member 116 is made from one piece of flat metal and may be stamped to the configuration shown. Such construction allows for easy mass production of members 116 and for the convenient storage and transportation thereof, since they will stack flat on one another. With the nails 138, 140, 142, 144 pre-inserted in arms 112, 114, it will be seen that no subassembly is needed, as in the previous embodiment. All that is needed to mount a trellis on a standard 110 already driven into the ground are a member 116, arms 112 and 114 (with nails therein), and three nails, 132, 134 and 136. The plate 118 of the elongate member 116 is nailed by nail 132 to the end of standard 110, the extensions 122, 128 are bent down and nailed to the sides of the standard 110 by means of nails 134, 136. The ends 116A and 116C are folded back upon themselves, either around the lines 42 or the wire hangers 166. The nails 138, 140 in arm 112, and nails 142, 144 in arm 114, are then fitted into slots 154, 159, 156, 160 of member 116 respectively. As may be seen, this is even more convenient than the assembly of the previous embodiment.

Again, as in the first embodiment, the design of the support member is such that no part of member 116 is subjected to compression forces when in use, thereby enabling such member to be formed from relatively thin sheet material that will have the desired tensile strength and which will allow relatively free bending thereof as the knocker rod 44 lifts the lines 42 upwardly during picking or if the knocker arm 44 hits the arms 112 or 114.

It is also clear that the present devices are quite simple in construction and are, of course, adaptable to a variety of uses.

It will be seen that the inventive concept described above is capable of being carried out in many different ways, of which the embodiments illustrated and described herein are merely illustrative. Consequently, we do not desire to be limited in any way by the particular details of the embodiments, but only by the scope of the following claims.

Having thus described our invention, we claim:

1. A device for supporting at least one line at a portion thereof along its length, the line having weight hung thereon along its length, said device comprising:
(a) a standard;
(b) an arm having one end adjacent the standard;
(c) a flexible strap fixed to the one end of the arm adjacent the standard and to the standard to allow substantial pivoting of the arm relative to the standard and movement of the arm away from the standard;
(d) means fixed to the end of the arm opposite that end to which the strap is fixed for receiving at least part of the weight of the line and at least part of the weight hung thereon and transferring said parts of said weights to the arm;
(e) flexible and inextensible means connecting the outer arm end and the standard for limiting the travel of the arm under said part of the weight of the line and said part of the weight hung thereon in a downward direction while allowing the arm to travel in at least one other direction.

2. Apparatus according to claim 1 wherein the flexible and inextensible means for limiting the travel of the arm under said part of the weight of the line and said part of the weight hung thereon while allowing the arm to travel in at least one other direction comprises a rod one end of which is fixed to the standard and the other end of which is fixed to the end of the arm opposite that end to which the strap is attached, the rod being positioned to be under tension when limiting the travel of the arm.

3. A device for supporting first and second lines at portions thereof along their respective lengths, each line having weight hung thereon along its length, said device comprising:
(a) a standard;
(b) a flexible strap extending up a portion of one side of the standard, across the top and down a portion of the opposite side;
(c) first and second arms each having one end secured to a lower end of the strap;
(d) a flexible rod fixed at its midpoint to the top of the standard and having portions fixed to those ends of the first and second arms opposite the ends fixed to the strap ends;
(e) means securing the strap to the standard at a substantial distance from the ends of the strap; and
(f) means for receiving at least part of the weight of the first and second lines and at least part of the weight hung thereon and applying the weight received to the first and second arms respectively, the arms being positioned to receive the weights in compression, the rod thereby limiting the travel of the arms under the respective weights while allowing the arms to travel in other directions.

4. A device according to claim 3 wherein said means for receiving the weight comprises first and second extended end portions of the rod.

5. A device for supporting at least one line at a portion thereof along its length, the line having weight hung thereon along its length, said device comprising:
(a) a standard;
(b) an arm having one end adjacent the standard and extending upwardly and outwardly therefrom;
(c) a plate fixed to the top of the standard and having a first flexible extension thereof extending downwardly adjacent the standard, the end of which is fixed to the one end of the arm adjacent the standard to allow substantial pivoting of the arm relative to the standard and movement of the arm away from the standard;
(d) means fixed to the end of the arm opposite that end to which the first flexible extension is fixed for receiving at least part of the weight of the line and at least part of the weight hung thereon and transferring said parts of said weights to the arm;
(e) flexible and inextensible means connecting the outer arm end and the standard for limiting the travel of the arm under said part of the weight of the line and said part of the weight hung thereon in a downward direction while allowing the arm to travel in at least one other direction.

6. Apparatus according to claim 5 wherein the means for limiting the travel of the arm under said part of the weight of the line and said part of the weight hung thereon while allowing the arm to travel in at least one other direction comprises a second flexible extension of the plate the end of which is fixed to the end of the arm opposite that end to which the first flexible extension is attached, the second flexible extension being positioned to be under tension when limiting the travel of the arm.

7. A device for supporting fisrt and second lines at portions thereof along their respective lengths, each line having weight hung thereon along its length, said device comprising:

(a) a standard;
(b) a plate fixed to one end of the standard and having
 (i) a first flexible extension thereof extending therefrom down one side of the standard;
 (ii) a second flexible extension thereof extending outward from the standard;
 (iii) a third flexible extension thereof extending therefrom down the opposite side of the standard; and
 (iv) a fourth flexible extension thereof extending outward from the standard in a direction substantially opposite that of the second flexible extension;
(c) a first arm having one end secured to the end of the first extension and the other end secured to the end of the second extension;
(d) a second arm having one end secured to the end of the third extension and the other end secured to the end of the fourth extension;
(e) means for receiving at least part of the weight of the first and second lines and at least part of the weight hung thereon and applying the weight received to the first and second arms respectively, the arms being positioned to receive the weight in compression, the second and fourth extensions thereby limiting the travel of the arms under the respective weights while allowing the arms to travel in other directions.

8. A device according to claim 7 wherein the plate and the extensions thereof are of substantially flat metal.

9. A device according to claim 8 wherein the ends of the second flexible extension and fourth flexible extensions are each folded to form a double thickness of flat metal in the regions where they are secured to the first and second arms respectively.

References Cited

UNITED STATES PATENTS

| | | | |
|---|---|---|---|
| 542,821 | 7/1895 | Broughton et al. | 47—44 |
| 2,275,282 | 3/1942 | Bigham | 248—42 |
| 2,914,278 | 11/1959 | Burke | 248—42 |
| 2,941,767 | 6/1960 | Mogey | 248—42 |
| 3,145,961 | 8/1964 | Holtzendorff | 47—42 XR |
| 3,337,988 | 8/1967 | Burton | 47—46 |
| 3,419,998 | 1/1969 | Burton | 47—46 |

FOREIGN PATENTS 199,955   1923   Britain.

ROBERT E. BAGWILL, Primary Examiner

U.S. Cl. X.R.

248—42, 221